United States Patent
Benson

(10) Patent No.: US 11,232,521 B2
(45) Date of Patent: Jan. 25, 2022

(54) METHODS, SYSTEMS, AND TOOLS FOR PROVIDING TAX RELATED SERVICES FOR VIRTUAL CURRENCY HOLDINGS

(71) Applicant: Lukka, Inc., New York, NY (US)

(72) Inventor: Jake Ryan Benson, Jonestown, TX (US)

(73) Assignee: Lukka, Inc., New York, NY (US)

( * ) Notice: Subject to any disclaimer, the term of this patent is extended or adjusted under 35 U.S.C. 154(b) by 538 days.

(21) Appl. No.: 14/686,044

(22) Filed: Apr. 14, 2015

(65) Prior Publication Data

US 2015/0294425 A1 Oct. 15, 2015

Related U.S. Application Data

(60) Provisional application No. 61/979,268, filed on Apr. 14, 2014.

(51) Int. Cl.
G06Q 40/00 (2012.01)

(52) U.S. Cl.
CPC .................................. G06Q 40/123 (2013.12)

(58) Field of Classification Search
None
See application file for complete search history.

(56) References Cited

U.S. PATENT DOCUMENTS

| | | | | |
|---|---|---|---|---|
| 8,583,516 B1 * | 11/2013 | Pitt | ....................... | G06F 17/243 705/31 |
| 2004/0024665 A1 * | 2/2004 | Foster | ................... | G06Q 40/02 705/31 |
| 2006/0155632 A1 * | 7/2006 | Cherkas | ................. | G06Q 40/02 705/36 R |
| 2012/0101922 A1 * | 4/2012 | Hakim | ................... | G06Q 20/10 705/30 |
| 2015/0170112 A1 * | 6/2015 | DeCastro | ............. | G06Q 20/381 705/39 |

(Continued)

OTHER PUBLICATIONS

Schon, Wolfgang. A Common Consolidated Corporate Tax Base for Europe. Springer. 2008. p. 37.*

(Continued)

*Primary Examiner* — Jason Borlinghaus
(74) *Attorney, Agent, or Firm* — Lowenstein Sandler LLP

(57) ABSTRACT

Technology is directed to tools for providing tax related services for virtual currency holdings, e.g., bitcoin holdings. The tax related services can include computation of taxes such as income tax, sales tax, and payroll tax for virtual currency holdings. The services can also include facilitating filing of the taxes with the concerned department. The tool can include a computing device configured to execute a tax application for computing the taxes on virtual currency holdings. The user provides information on a source of virtual currency transactions, e.g., an address of a bitcoin wallet, to the tax application, and the tax application retrieves the transactions from the source. The tax application categorizes the transactions into various transaction types and identifies the taxable and/or non-taxable transactions. The gain/loss and the associated tax are computed for the taxable transactions using one or more cost-basis methods.

20 Claims, 18 Drawing Sheets

(56) References Cited

U.S. PATENT DOCUMENTS

2016/0012465 A1* 1/2016 Sharp .................... G06Q 20/18
705/14.17

OTHER PUBLICATIONS

Blockchain Intelligence, Coinalytics, [website], [accessed on Mar. 6, 2016], <http://coinalytics.co/>, 2015, 4 pages.
Calculate Bitcoin Taxes for Capital Gains and Income, BitcoinTaxes, [website], [retrieved on Mar. 6, 2016, Retrieved from: <https://bitcoin.tax>, 2016, 4 pages.
Coin Ledger, Coinbase, [website], [accessed on Mar. 6, 2016], <https://www.coinbase.com>, 4 pages.
Coinbase, [website], [accessed on Mar. 6, 2016], Retrieved from: <https://support.coinbase.com>, 2016., 3 pages.
Blockchain Solutions for Business, Coyno, [online], [accessed on Mar. 6, 2016], Retrieved from: <coyno.com>, 4 pages.
Kryptokit, [website], [accessed on Mar. 6, 2016], Retrieved from: <http://kryptokit.com>, 4 pages.
Tapeke, [website], <http://tapeke.com>, 2015, 4 pages.

* cited by examiner

| Date | Destination | Note | Amount | Currency | Spot Value | Value | Type |
|---|---|---|---|---|---|---|---|
| 02/21/13 | #<Account: | Paid for with | 10 | BTC | 26.76 | 267.6 | purchase |
| 02/27/13 | txdan2010@ | Paid for with | 10 | BTC | 29.951 | 299.51 | purchase |
| 03/03/13 | | | 4.94928804 | BTC | 34.01 | 168.33 | purchase |
| 03/03/13 | | | 0.00032 | BTC | 34.01 | 0.01 | purchase |
| 03/05/13 | 1JEsEzS8avkxUW9WVgQ | | -10 | BTC | 39.28 | -392.8 | sale |
| 03/05/13 | txdan2010@ | Paid for with | 10 | BTC | 39.28 | 392.8 | purchase |
| 03/06/13 | | | 10 | BTC | 32.84 | 328.4 | purchase |
| 03/07/13 | transfers@c | $1,270.51 w | -34 | BTC | 37.3679411 | -1,270.51 | sale |
| 03/07/13 | transfers@c | $34.72 will | -0.95 | BTC | 36.5473684 | -34.72 | sale |

Non-taxable Events

- Purchase = Cost Basis is established at a specific rate or fair market value
- Gift Received = Cost Basis is established from previous owner's original cost basis
- Gift Sent = No Capital Gains/Losses are realized (unless amount exceeds $14,000)
- Transfer = No effect Taxable Events

- Income = Cost Basis is established at a specific rate or fair market value and that value is added to earned income
- Sale = Capital Gains/Losses are realized
- Donation = No Gains/Losses are realized - fair market value of coins creates a tax deduction

*FIG. 6*

Cost Basis Methods

705 — FIFO: Bitcoins acquired first are sold first.
(Rising prices result in more recognized gains)

710 — LIFO: Bitcoins acquired last are sold first.
(Falling prices result in more recognized gains)

715 — AVCO: Averages the original cost basis from all available coins. (CANADA ONLY)
(Price trend has little effect, recognized gains fall somewhere in the middle)

720 — OPT High Cost: Bitcoins acquired at the highest price are sold first.
(Price trend has little affect, recognized gains are minimized)

725 — OPT Long Term: Bitcoins acquired at the highest price are sold as priority only after all long term gains are recognized.
(Long Term gains are taxed at a lower rate)

*FIG. 7*

| Description of p | Date acquired | Date sold or dis | Proceeds (sales | Cost or other b | Gain or loss | Short/Long-term |
|---|---|---|---|---|---|---|
| 1.0000 Bitcoin | 05/15/14 | 07/22/14 | 618.84 | 446.8 | 172.04 | Short |
| 1.0199 Bitcoin | 05/15/14 | 07/22/14 | 631.16 | 518.53 | 112.63 | Short |
| 1.9801 Bitcoin | 05/15/14 | 08/08/14 | 1,161.7 | 1,006.7 | 155 | Short |
| 0.1505 Bitcoin | 05/22/14 | 08/08/14 | 88.3 | 76.52 | 11.78 | Short |
| 2.2039 Bitcoin | 05/22/14 | 08/12/14 | 1,250 | 1,120.48 | 129.52 | Short |
| 2.4324 Bitcoin | 05/22/14 | 08/22/14 | 1,250 | 1,236.66 | 13.34 | Short |
| 0.2132 Bitcoin | 05/22/14 | 09/05/14 | 101.87 | 108.39 | -6.52 | Short |
| 2.4028 Bitcoin | 05/22/14 | 09/05/14 | 1,148.13 | 1,221.61 | -73.48 | Short |
| 2.1528 Bitcoin | 05/22/14 | 01/20/15 | 418.42 | 1,094.5 | -676.09 | Short |
| 0.5972 Bitcoin | 05/22/14 | 01/20/15 | 116.07 | 303.62 | -187.55 | Short |
| 0.1000 Bitcoin | 05/22/14 | 01/20/15 | 21.14 | 50.84 | -29.7 | Short |
| 1.0000 Bitcoin | 05/22/14 | 01/20/15 | 211.35 | 508.41 | -297.06 | Short |
| 0.5100 Bitcoin | 05/22/14 | 01/20/15 | 107.79 | 259.29 | -151.5 | Short |
| 0.6200 Bitcoin | 05/22/14 | 01/20/15 | 131.04 | 315.21 | -184.17 | Short |
| 1.4200 Bitcoin | 05/22/14 | 01/20/15 | 300.12 | 721.94 | -421.82 | Short |
| 6.5100 Bitcoin | 05/22/14 | 01/20/15 | 1,375.89 | 3,309.75 | -1,933.86 | Short |
| 0.0048 Bitcoin | 05/22/14 | 01/20/15 | 1.01 | 2.44 | -1.43 | Short |
| 0.0500 Bitcoin | 05/22/14 | 01/20/15 | 10.57 | 25.42 | -14.85 | Short |
| 0.0500 Bitcoin | 05/22/14 | 01/20/15 | 10.57 | 25.42 | -14.85 | Short |
| | | | 8,953.97 | 12,352.54 | -3,398.57 | |

*FIG. 9A*

Balance Report 1000

| Date | Purchases | | | Sales | | | Balance | |
|---|---|---|---|---|---|---|---|---|
| | Amount (Coin) | Value Per Coin | Total Value | Amount (Coin) | Value Per Coin | Total Value | Amount (Coin) | Total Value |
| 05/01/14 | 9,349,289.45 | 0.0053480000 | 50,000 | | | | 9,349,289.45 | 50,000 |
| 05/15/14 | | | | -193,467 | 0.0078836700 | -1,525.23 | 9,155,822.45 | 48,474.77 |
| 05/15/14 | 3 | 508.41 | 1,525.23 | | | | 9,155,825.45 | 50,000 |
| 05/15/14 | 64,000 | 0.01696125 | 446.8 | | | | 9,219,825.45 | 50,446.8 |
| 05/15/14 | 1 | 446.8 | 446.8 | | | | 9,219,826.45 | 50,893.6 |
| 05/15/14 | | | | -175,560 | 0.0071200729 | -1,250 | 9,044,266.45 | 49,643.6 |
| 05/16/14 | | | | -1,476,668.64 | 0.0067719999 | -10,000 | 7,567,597.81 | 39,643.6 |
| 05/22/14 | 0.08 | 508.375 | 40.67 | | | | 7,567,597.89 | 39,684.27 |
| 05/23/14 | | | | -440,917.86 | 0.0034592157 | -1,525.23 | 7,126,680.03 | 38,159.04 |

*FIG. 10*

Outgoing Report 1100

| Date | Amount Sold (Coin) | Sale Value Per Coin | Total Value (Fiat) | Realized Gains/Losses |
|---|---|---|---|---|
| 07/22/14 | 2.0199 | 618.8425 |  | 284.67 |
| 08/08/14 | 2.1306 | 586.6892 |  | 166.78 |
| 08/12/14 | 2.2039 | 567.1764 |  | 129.52 |
| 08/22/14 | 2.4324 | 513.8957 |  | 13.34 |
| 09/05/14 | 2.616 | 477.8287 |  | -80 |
| 01/20/15 | 2.75 | 194.36 | 534.49 | -863.64 |
| 01/20/15 | 0.1 | 211.4 | 21.14 | -29.7 |
| 01/20/15 | 1 | 211.35 | 211.35 | -297.06 |
| 01/20/15 | 0.51 | 211.3529 | 107.79 | -151.5 |
| 01/20/15 | 0.62 | 211.3548 | 131.04 | -184.17 |
| 01/20/15 | 1.42 | 211.3521 | 300.12 | -421.82 |
| 01/20/15 | 6.51 | 211.3502 | 1,375.89 | -1,933.86 |
| 01/20/15 | 0.0048 | 210.4167 | 1.01 | -1.43 |
| 01/20/15 | 0.05 | 211.4 | 10.57 | -14.85 |
| 01/20/15 | 0.05 | 211.4 | 10.57 | -14.85 |

*FIG. 11*

Incoming Report 1200

| Lot # | Date | Lot Amount (Coin) | Amount Sold (Coin) | Cost Basis Per Coin | Total Cost Basis (Fiat) | Basis Sold (Fiat) |
|---|---|---|---|---|---|---|
| 1 | 04/17/13 | 10 | 10 | 66.645 | 666.45 | 1,089.4929 |
| 2 | 06/12/13 | 10 | 10 | 109.277 | 1,092.77 | 1,084.7631 |
| 3 | 11/04/13 | 10 | 9.2466 | 236.597 | 2,187.7284 | 5,935.6078 |
| 4 | 11/05/13 | 9 | 9 | 254.5867 | 2,291.28 | 4,994.4222 |
| 5 | 11/06/13 | 5 | 5 | 273.256 | 1,366.28 | 3,046.55 |
| 6 | 11/07/13 | 10 | 10 | 303.591 | 3,035.91 | 6,093.1 |
| 7 | 11/08/13 | 6 | 6 | 330.4667 | 1,982.8 | 3,655.86 |
| 8 | 11/21/13 | 7 | 7 | 708.5971 | 4,960.18 | 4,265.17 |
| 9 | 04/24/14 | 0.5 | 0.5 | 489.4 | 244.7 | 304.655 |
| 10 | 04/24/14 | 0.1 | 0.1 | 489.4 | 48.94 | 60.931 |
| 11 | 06/06/14 | 7.1051 | 7.1051 | 656.11 | 4,661.7268 | 4,329.2082 |
| 12 | 06/06/14 | 0.999 | 0.999 | 656.11 | 655.4539 | 539.5526 |
| 13 | 06/27/14 | 0.0797 | 0.0797 | 609.31 | 48.562 | 37.667 |
| 14 | 06/27/14 | 0.119 | 0.119 | 609.31 | 72.5079 | 56.2406 |
| 15 | 07/07/14 | 0.005 | 0.005 | 609.31 | 3.0465 | 2.363 |
| 16 | 08/18/14 | 5 | 5 | 474.31 | 2,371.55 | 2,102.4851 |

*FIG. 12*

Master Report 1300

| Lot # | Date Purchased | Original Amount | Amount Sold | Cost Basis P | Total Cost B | Date Sold | Sale Value P | Total Sale V | Realized Gain | Short/Long |
|---|---|---|---|---|---|---|---|---|---|---|
| 1 | 04/17/13 | 10 | 0.3264 | 66.645 | 15.09 | 05/29/13 | 129.37 | 29.29 | 14.2 | Short |
| 1 | 04/17/13 | 9.7736 | 9.7736 | 66.645 | 651.36 | 08/22/13 | 108.48 | 1,060.21 | 408.84 | Short |
| 2 | 06/12/13 | 10 | 10 | 109.277 | 1,092.77 | 08/22/13 | 108.48 | 1,084.76 | -8.01 | Short |
| 3 | 11/04/13 | 10 | 7 | 236.597 | 1,656.18 | 11/18/13 | 685.75 | 4,800.25 | 0 | Donation |
| 3 | 11/04/13 | 3 | 2 | 236.597 | 473.19 | 04/17/14 | 504.83 | 1,009.66 | 0 | Donation |
| 3 | 11/04/13 | 1 | 0.0303 | 236.597 | 7.18 | 04/17/14 | 504.83 | 15.31 | 8.14 | Short |
| 3 | 11/04/13 | 0.9697 | 0.9697 | 236.597 | 229.42 | 04/23/14 | 488.63 | 473.81 | 0 | Donation |
| 4 | 11/05/13 | 9 | 1.0203 | 254.5867 | 262.31 | 04/23/14 | 488.63 | 503.45 | 0 | Donation |
| 4 | 11/05/13 | 7.9697 | 0.1 | 254.5867 | 25.46 | 04/29/14 | 444.15 | 44.41 | 18.96 | Short |
| 4 | 11/05/13 | 7.8697 | 0.05 | 254.5867 | 12.73 | 04/29/14 | 444.15 | 22.21 | 9.48 | Short |
| 4 | 11/05/13 | 7.8197 | 0.8743 | 254.5867 | 222.59 | 04/30/14 | 445.35 | 389.37 | 166.78 | Short |
| 4 | 11/05/13 | 6.9454 | 0.05 | 254.5867 | 12.73 | 06/03/14 | 651.69 | 32.58 | 19.86 | Short |
| 4 | 11/05/13 | 6.8954 | 0.0756 | 254.5867 | 19.25 | 06/06/14 | 656.11 | 49.6 | 30.36 | Short |
| 4 | 11/05/13 | 6.8198 | 3 | 254.5867 | 763.76 | 06/10/14 | 644.52 | 1,933.56 | 1,169.8 | Short |
| 4 | 11/05/13 | 3.8198 | 0.005 | 254.5867 | 1.27 | 07/07/14 | 609.31 | 3.05 | 1.77 | Short |
| 4 | 11/05/13 | 3.8148 | 0.001 | 254.5867 | 0.25 | 07/08/14 | 609.31 | 0.61 | 0.35 | Short |
| 4 | 11/05/13 | 3.8138 | 1.5 | 254.5867 | 381.88 | 07/10/14 | 282 | 423 | 0 | Donation |

*FIG. 13*

METHODS, SYSTEMS, AND TOOLS FOR PROVIDING TAX RELATED SERVICES FOR VIRTUAL CURRENCY HOLDINGS

CROSS-REFERENCE TO RELATED APPLICATION(S)

This application claims the benefit of U.S. Provisional Application Ser. No. 61/979,268 titled "METHODS, SYSTEMS, AND TOOLS FOR PROVIDING TAX RELATED SERVICES FOR VIRTUAL CURRENCY HOLDINGS" filed Apr. 14, 2014, which is incorporated herein by reference for all purposes in its entirety.

BACKGROUND

A virtual currency is a type of unregulated, digital money, which is issued and usually controlled by its developers, and used and accepted among the members of a specific virtual community. The US Department of Treasury defines it as "a medium of exchange that operates like a currency in some environments, but does not have all the attributes of real currency". Digital currency is a form of virtual currency or medium of exchange that is electronically created and stored. Some digital currencies are cryptocurrencies, for example Bitcoin; others are not, like the Ven. Like traditional money these currencies can often be used to buy physical goods and services. The virtual currency can be decentralized, as for example Bitcoin. A decentralized currency is defined by the US Department of Treasury as a "currency (1) that has no central repository and no single administrator, and (2) that persons may obtain by their own computing or manufacturing effort". Trust in the currency is based on the "transaction ledger which is cryptographically verified, and jointly maintained by the currency's users".

Bitcoins are created by a process called mining, in which computer network participants, i.e., users who provide their computing power, verify and record payments into a public ledger in exchange for transaction fees and newly minted bitcoins. Users send and receive bitcoins using wallet software on a personal computer, mobile device, or a web application. Bitcoins can be obtained by mining or in exchange for products, services, or other currencies. The bitcoins market currently suffers from volatility, limiting bitcoins to act as a stable store of value. Where people are allowed to buy in bitcoins, prices are denominated in fiat currency at the amount of bitcoins paid is determined by the prevailing exchange rate. Some studies suggest that bitcoin is over 7 times as volatile as gold. However, bitcoin as a form of payment for products and services has seen growth, and merchants have an incentive to accept the currency because transaction fees are lower than that typically imposed by credit card processors.

Certain countries, e.g., United States of America, have issued a guidance stating that virtual currencies are to be treated as "property" for all tax purposes and that the virtual currency holders have to pay taxes on them. In some cases, the virtual currencies can be treated as stock, and therefore, the tax computation can be subject to complex cost basis calculations. As the virtual currencies are volatile, i.e., the value of the currencies keep changing frequently, the task of keeping track of the cost basis becomes daunting, and so does the computation of taxes. Further, this problem can be compounded if the virtual currency transactions are performed using a number of services. Each of the sources can maintain a transaction log in a different format. It can be extremely complex and time consuming to gather the transactions from these various sources and understand them collectively so as to prepare the tax forms correctly. There are no tools, e.g., applications or services that comprehensively address the determination of taxes for holdings in virtual currencies such as bitcoins.

BRIEF DESCRIPTION OF THE DRAWINGS

FIG. 3B is a block diagram illustrating an example data file which a user can upload to the server of FIG. 1, consistent with various embodiments.

FIG. 4 is a block diagram illustrating an example of a transaction log generated by the server of FIG. 1 based on transactions extracted from various sources, consistent with various embodiments.

FIG. 6 is a block diagram illustrating an example of classification of transaction types of FIG. 5 into taxable and non-taxable transactions, consistent with various embodiments.

FIG. 7 is a block diagram illustrating examples of cost basis methods used by the server of FIG. 1 to compute taxes on virtual currency holdings, consistent with various embodiments.

FIG. 9A is an illustration of an example tax report including the gains and/or losses computed by the server of FIG. 1 for the virtual currency holdings, consistent with various embodiments.

FIG. 10 is an illustration of a balance report including purchase, sales and balance information of the virtual currency holdings, consistent with various embodiments.

FIG. 11 is an illustration of an outgoing report including information regarding outgoing transactions of the virtual currency holdings, consistent with various embodiments.

FIG. 12 is an illustration of an incoming report including information regarding incoming transactions of the virtual currency holdings, consistent with various embodiments.

FIG. 13 is an illustration of a master report including information regarding incoming and outgoing transactions and gains and/or loss, consistent with various embodiments.

DETAILED DESCRIPTION

Figure 1:
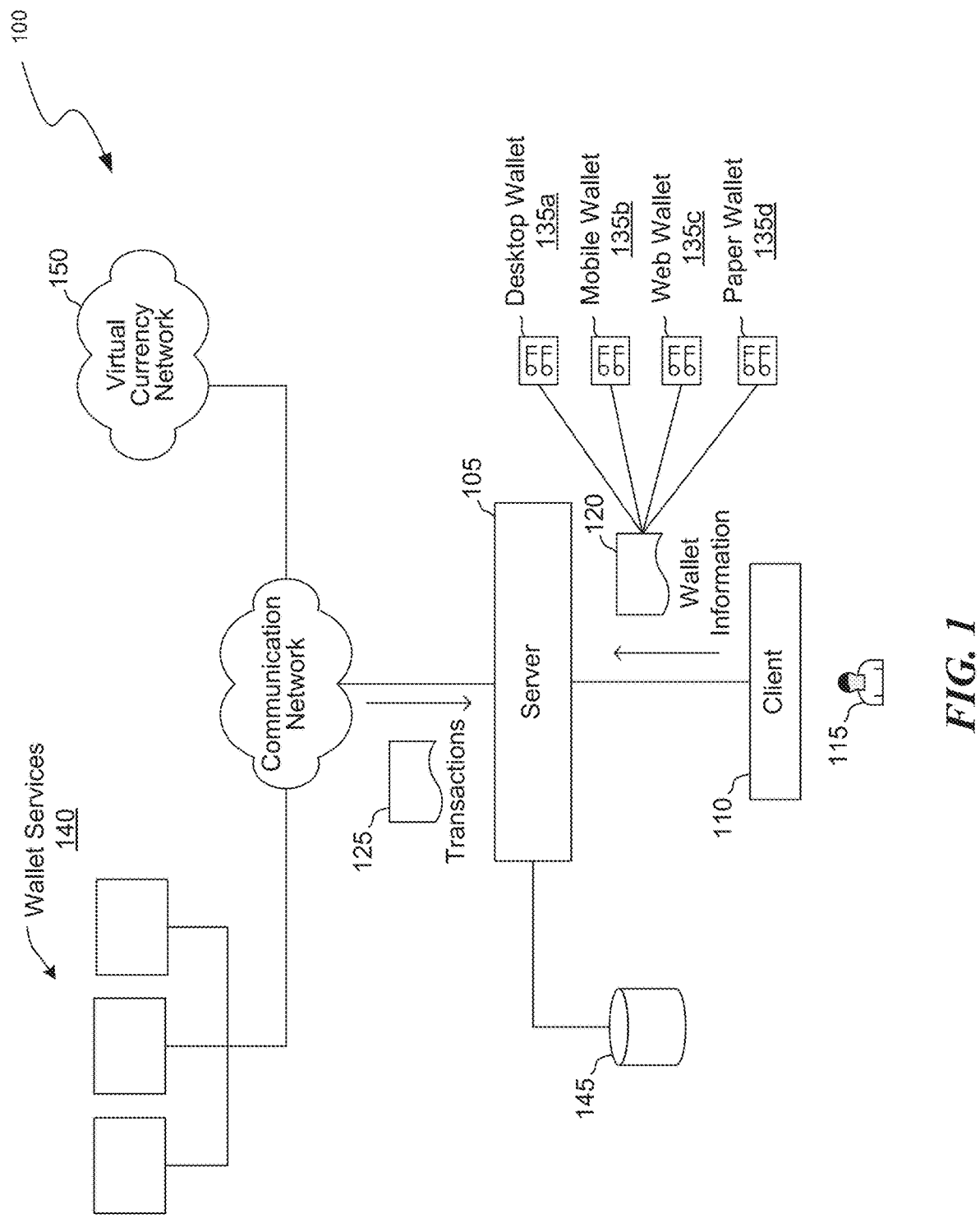
FIG. 1 is an environment in which embodiments for providing tax related services for virtual currency holdings can be implemented.

Introduced here are embodiments for providing tax related services for virtual currency holdings. In some embodiments, the tax related services for virtual currency holdings include computation of income tax for income earned via virtual currency, computation of sales tax in transactions performed using virtual currency, and facilitating filing of the income tax and/or sales tax with the concerned agency/department. The tax related services (hereinafter referred to as "tax application") can be implemented in a server computing device ("server") that can be accessed by a user using a client computing device ("client") over a communication network such as Internet. For example, the user can access the tax application via a uniform resource location (URL). A virtual currency can be obtained from a virtual currency network, e.g., a Bitcoin network, which is a distributed computing system. The server can compute an income tax on an income earned by a tax paying entity, e.g., a user, an organization, through the virtual currency holdings. The server can extract the virtual currency transactions from one or more sources specified by the tax paying entity, e.g., a digital wallet that facilitates buying and/or selling of virtual currency holdings, analyze the transactions to identify the taxable transactions, compute the gains and/or losses, e.g., in fiat currency, based on one or more cost basis methods, and compute the income tax based on the gains and/or losses. In some embodiments, the server computes the income tax as per the laws of a particular state and/or country where the income tax is to be filed. The server can obtain the exchange rate between the virtual currency and the fiat currency from various sources over the communication network.

The server can extract the virtual currency transactions from the one or more sources and present it to the user on the client in a specific format. The transactions at different sources can be in different formats. The server can use an application programming interface (API) provided by a specified source to extract the transactions from the specified source. In some embodiments, the server categorizes the incoming transactions, e.g., transactions representing a receipt of a virtual currency holding at a particular source, as a "purchase," and the outgoing transactions, e.g., transactions representing a virtual currency holding sent from a particular source, as a "sale." In some embodiments, the server categorizes the transactions that represent a transfer of the virtual currency holding from one source to another source, e.g., from a first digital wallet of the user to a second digital wallet of the user, as a "transfer." While at least some of the purchases and sales are taxable, the transfers are not taxable. Accordingly, the server can prompt the user to identify the purchases and sales transactions that are taxable.

After the user identifies the taxable transactions, the server can prompt the user to select a cost basis method, e.g., first in first out (FIFO), last in first out (LIFO), average cost (AVCO), optimized high cost (OPT-H), optimized long term (OPT-L), for computing the taxes. In some embodiments, the server computes the taxes based on a number of cost basis methods and presents the computed taxes to the user. The user can then choose one of the cost basis methods, e.g., one in which the income tax is the least. After the user selects a particular cost basis method, the server can generate various reports that the user can use for filing the income tax with the concerned authorities. Additional details with respect to the cost basis methods and the tax reports are described at least with reference to FIGS. 7-13.

In some embodiments, the tax application can be implemented as an application ("app") that can be downloaded to and executed on the client. Further, in some embodiments, a portion of the tax application can be implemented at the server and another portion of the tax application can be implemented in the app. The client can include a desktop computer; a mobile device such as a mobile phone, a smartphone, a tablet, a laptop; or other computing devices that are capable of executing mobile applications. In some embodiments, the tax application can be integrated with a third party application, which is typically used to determine taxes for transactions involving real currency. The tax application can provide an API using which the tax application can be integrated with the third party application. Further, the tax application can be accessed on various operating systems, including iOS, Mac, Android, and Windows. The tax application can be used by a number of taxpaying entities, including an individual, a merchant, an organization, or a third party application that would like to use the services provided by the tax application. The tax application can be used to determine taxes such as income tax, sales tax, payroll tax, or capital gains tax.

Note that while the entire document describes the server as performing the various functionalities of the tax application, the functionalities can be performed by the client in which the tax application is executing or by both the server and the client in which portions of the tax application are implemented.

FIG. 1 is an environment in which embodiments for providing tax related services for virtual currency holdings can be implemented. The environment 100 includes a virtual currency network 150 that facilitates multiple users to send and/or receive and buy and/or sell virtual currency holdings. In some embodiments, the virtual currency network 150 is a Bitcoin network and the virtual currency holding is a bitcoin. The environment 100 includes a server 105 that is configured to provide various tax related services, such as the ones provided by the tax application described above, for the virtual currency holdings. In some embodiments, the server 105 computes taxes, e.g., income tax on an income earned through the virtual currency holdings, for a taxpaying entity, e.g., user 115. The server 105 can generate various reports 130, e.g., tax report, that the user 115 can use in filing the taxes with the concerned authorities.

The user 115 can make virtual currency transactions, e.g., send and/or receive virtual currency holdings such as bitcoins, in the virtual currency network 150 using one or more wallet services 140. The user 114 can access the server 105, the wallet services 140, and/or the virtual currency network 150 using the client 110. The wallet services 140 allow the user 115 to create a wallet, e.g., a digital wallet, from which the user 115 can send the virtual currency holdings and/or receive the virtual currency holdings at. The user 115 can create multiple wallets from multiple wallet services 140. Each of the wallets has an address using which the user 115 can send and/or receive the virtual currency holdings at a particular wallet. The address is unique to a specific wallet and to the user 115. That is, no two wallets in the virtual currency network 150 have the same address for the user 115 or between user 115 and other users. The server 105 can obtain the wallet information 120, e.g., wallet address, from the user 115 and extract the virtual currency transactions 125 of the user 115 from the wallet services 140. The server 105 analyzes the virtual currency transactions 125 to identify the taxable transactions, computes the gains and/or losses based on one or more cost basis methods, and computes the income tax on the gains and/or losses accordingly. In some embodiments, the server 105 computes the gains and/or losses and the income tax in fiat currency. The environment 100 includes a storage system 145 that can be used to store various data, e.g., profiles of users, transactions extracted from various sources, reports 130.

The following paragraphs describe the embodiments with respect to Bitcoin network and bitcoin virtual currency holdings. However, it should be noted that the embodiments described herein are not limited to bitcoins, and are applicable to any virtual currency in general.

In some embodiments, bitcoins are treated as property and therefore, general tax principles applicable to property transactions can apply to transactions using bitcoins. That is, any sale or exchange of bitcoins, or the use of bitcoins to pay for goods or services in a real-world economy transaction has tax consequences that may result in a tax liability. For example, a taxpaying entity obtaining income in the form of bitcoins is liable for income tax. In another example, a taxpaying entity such as a merchant selling goods or services for bitcoins can be liable for sales tax (and/or income tax). In yet another example, a taxpaying entity such as an organization paying salaries to their employees as bitcoins can be liable for paying payroll taxes.

In some embodiments, value of the bitcoins is realized in terms of the fair market value in real currency, e.g., U.S. dollars, as of the date of payment or receipt. If the bitcoin is listed on an exchange and the exchange rate is established by market supply and demand, the fair market value of the bitcoins is determined by converting the bitcoins into real currency. If the fair market value of property received in exchange for bitcoins exceeds the taxpayer's adjusted basis of the bitcoins, the taxpayer has taxable gain. The taxpayer has a loss if the fair market value of the property received is less than the adjusted basis of the bitcoins.

Bitcoin transactions are performed using various wallets 135, e.g., a digital wallet or a paper wallet, which can be generated using the wallet services 140. The user 115 can perform transactions such as sending and/or receiving bitcoins using the digital wallet. The digital wallet can be an application executing on the client 110, a mobile app executing on the client 110, a service offered by a server of one of the wallet services 140 or something else entirely. The digital wallet can be a desktop wallet 135*a*, a mobile wallet 135*b*, or a web wallet 135*c*. In some embodiments, the wallet can also be a paper wallet 135*d*. The wallet can add a transaction to a public ledger 155 of the Bitcoin network. Regardless of the types of the wallets, the purpose of any wallet includes storing private keys of the taxpaying entities, sending bitcoins to other people, generating wallet addresses, so that the taxpaying entity can receive bitcoins from other people, and viewing transaction history and current balance.

The desktop wallet 135*a* can be an application installed on the client 110 of the user 115. The private keys of the user 115 are stored locally, in a file on the client 110. A web wallet 135*c*, such as Coinbase or Blockchain.info's My Walletservice, stores private keys, usually encrypted, on servers of the wallet services 140 instead of the client 110. A mobile wallet 135*b* is an app installed on a mobile device such as a smartphone or a tablet. The mobile wallet 135*b* may store the private keys either on the mobile device of the user 115 or online. In some embodiments, a paper wallet 135*d* is a mechanism for storing bitcoins offline as a physical document that can be secured like cash or anything else of real-world value. Paper wallets 135*d* are generally created by printing a brand new public address and private key onto paper, and then sending bitcoins from a "live" wallet to the printed wallet's public address for safekeeping.

The user 115 can provide wallet information 120, e.g., address of the wallets, user account information of wallet service, associated with the user 115, to the server 105. If the user 115 has more than one wallet, the user 115 may provide the wallet information 120 of all the wallets 135 to the server 105. The server 105 accesses the wallets of the user 115 using the provided addresses and retrieves the transactions made using the bitcoins. After retrieving the transactions, the server 105 and/or the user 115 identifies the transactions that are taxable. The server 105 can then determine the gains or losses based on a cost basis method, which can be extremely complex. The cost basis method can be specified by the user 115 and/or selected by the server 105. The server 105 may have to consider various factors for computing the taxes on bitcoin holdings. For example, the server 105 may have to track and record the fair market value of the bitcoins when bought and when sold to determine the gain and/or loss.

Depending on the selected cost basis method, the server 105 determines the gains and/or loss as a function of the value of the bitcoins on the date the user 115 received and the value on the date the user 115 used the bitcoins to buy goods or services or exchanged them for real currency. In some embodiments, the server 105 obtains the fair market value of the bitcoins on a particular date from a specified source (not illustrated). In some embodiments, the server 105 computes the tax for each of the cost basis methods supported by the server 105 (and also compliant with the local tax laws). The user 115 may then choose a particular cost basis method, e.g., the one in which the computed tax is the least. The server 105 can generate the necessary reports 130, e.g., prepared tax forms, that can be used to file the taxes, e.g., in person or via mail, with the concerned department. In some embodiments, the server 105 also facilitates electronic filing of the taxes with concerned department. Additional details with respect to the tax services offered by the server 105 are described at least with reference to FIGS. 2-13 below.

Figure 2:
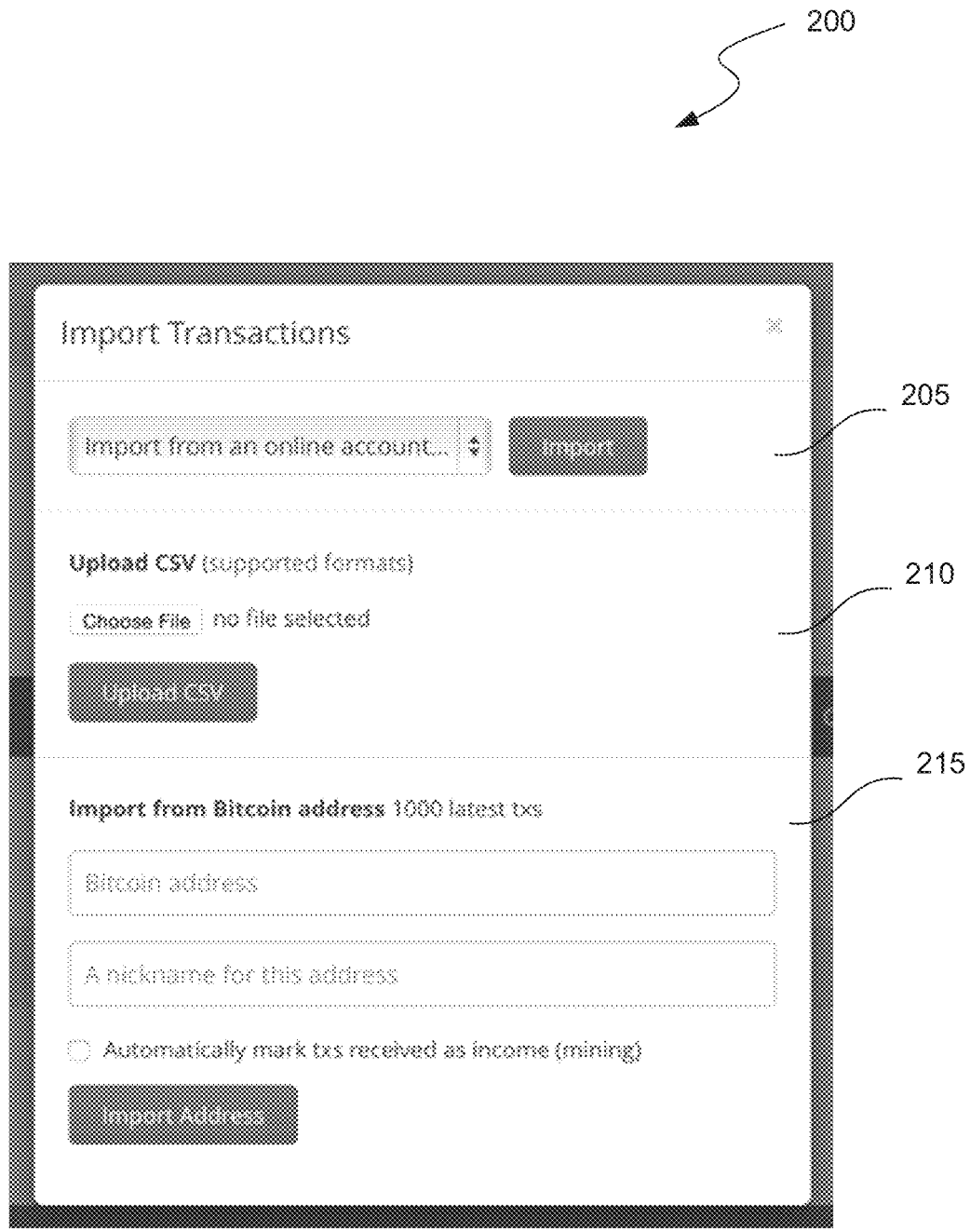
FIG. 2 is an example graphical user interface (GUI) for specifying wallet information to a server of FIG. 1, consistent with various embodiments.

FIG. 2 is an example graphical user interface (GUI) 200 for specifying wallet information to the server of FIG. 1, consistent with various embodiments. The server 105 can retrieve the bitcoin transactions of the user 115 from various sources. For example, the server 105 can retrieve the bitcoin transactions from a web wallet. In another example, the server 105 can retrieve the bitcoin transactions from a data file of a specified format, e.g., comma separated values (CSV). In yet another example, the server 105 can retrieve the bitcoin transactions from the virtual currency network 150, e.g., from a public ledger of the Bitcoin Network.

Figure 3A:
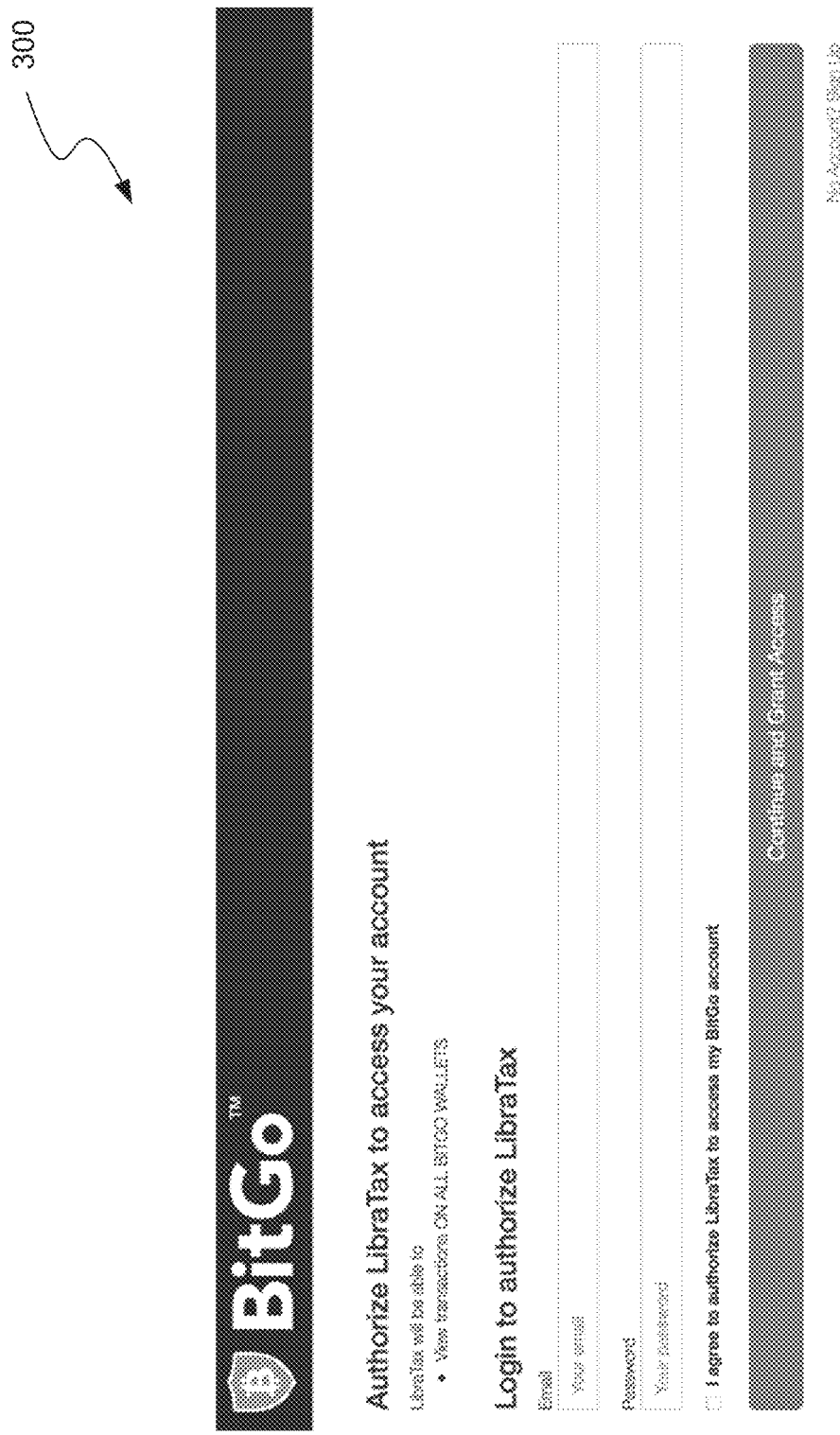
FIG. 3A is an example GUI for providing authentication information of a web wallet service, consistent with various embodiments.

The GUI 200 allows the user 115 to provide the wallet information 120, e.g., web wallet of the various digital wallets. If the user 115 has a web wallet, the user 115 may specify the web wallet service in a first portion 205 of the GUI 200. In some embodiments, the first portion 205 of the GUI can include a list of web wallet services supported by the server 105. An example of the web wallet service can include BitGo, coinbase, Bitstamp, and Blockchain.info. FIG. 3A is an example GUI 300 for providing authentication information of a web wallet service, consistent with various embodiments. After the user 115 specifies a web wallet service in the first portion 205 of the GUI 200, the server 105 requests the user 115 to provide authentication information, e.g., username and password, for accessing the web wallet service. The GUI 300 illustrates an authentication screen for the BitGo web wallet service. After the authentication process is successful, the server 105 extracts the bitcoin transactions from the web wallet service. In some embodiments, the server 105 uses a wallet connection API provided by the web wallet service to connect with the web wallet service and extract the transactions.

The web wallet service can store the bitcoin transactions in a format specific to the wallet service. For example, the web wallet service can store the transactions as a CSV file, as a serialized data object, in a database etc. Further, the bitcoin transactions in the web wallet can have additional data fields than that is required by the server 105. The server 105 uses the API of the web wallet service to identify and extract the data fields that the server 105 may require for the purpose of computation of the taxes and converts the retrieved transactions into a format supported by the server 105, e.g., a structured data object. The server 105 defines a set of fields in the structured data object that represents a transaction and may be used in computing the taxes. In some embodiments, the server 105 retrieves data only for the data fields that are defined in the structured data object. For example, if the structured data object has n data fields and a BitGo transaction has m number of data fields and where m>n, then the server 105 retrieves data for only the n data fields. The server 105 stores the structured data object at the storage system 145.

Returning to the GUI 200 of FIG. 2, the user 115 can also upload the bitcoin transactions to the server 105 by uploading a data file containing the bitcoin transactions. The user 115 may specify the data file to be uploaded in a second portion 210 of the GUI 200. The data file can be in any of the formats supported by the server 105, e.g., a spreadsheet, a delimited file such as a CSV file. FIG. 3B is a block diagram illustrating an example data file 325 which the user 115 can upload to a server of FIG. 1, consistent with various embodiments. The data file 325 is a spreadsheet containing the bitcoin transactions. A transaction can include a variety of information. In some embodiments, the information can include the date on which the transaction is performed, an amount of bitcoins involved in the transaction, an entity with which the transaction is performed, any notes associated with the transaction, the value of the bitcoins in terms of fiat or real currency, e.g., U.S. dollars. In some embodiments, the data file 325 can be a file generated by or exported from third party applications, e.g., wallet services 140. As described above, at least with respect to the web wallet, the data file 325 can have various data fields, e.g., more than that is required by the server 105. The server 105 can extract the data fields that may be required for the purpose of computation of the taxes and convert the retrieved transactions into the structured data object.

Returning to the GUI 200 of FIG. 2, the user 115 can also provide a wallet address, e.g., Bitcoin wallet address, to the server 105 and the server 105 can extract the bitcoin transactions from the virtual currency network 150, e.g., from a public ledger of the Bitcoin Network. The server 105 extracts all the bitcoin transactions associated with the provided wallet address and converts the transactions to the structured data object. The server 105 can create a structured data object for each of the wallets, or can include the transactions from all the wallets into a single structured data object. The user 115 may specify the wallet address in a third portion 215 of the GUI 200. The user 115 can also assign a name to the wallet address, e.g., for convenience in identifying the account.

FIG. 4 is a block diagram illustrating an example of a transaction log 400 generated by the server of FIG. 1 based on the transactions extracted from various sources, consistent with various embodiments. In some embodiments, the transaction log 400 can be generated from the structured data object, which contains the bitcoin transactions of the user 115 extracted by the server 105 from various sources. The transaction log 400 can include a variety of information. In some embodiments, the transaction log 400 can include a date field which indicates a date the transaction is performed. The date field can also include a timestamp that indicates a time of the transaction. The transaction log 400 can include a destination field which indicates a wallet address/account (or name of the wallet) at which a virtual currency is received and/or sent to. If the user 115 has set a name for a wallet address, the transaction log 400 displays the name instead of the wallet address.

The transaction log 400 includes a note data field that includes any notes associated with the transaction. The note can be part of the original transactions imported from any of the sources, or can be input by the user 115 in the transaction log 400. In some embodiments, the server 105 enables the user 115 to add a hash tag to a transaction, e.g., in the note field. The hash tag can be used to categorize the transaction into one or more user-defined categories. For example, the user 115 can create a hash tag "#Food Expenses" and associate a transaction with the hash tag to indicate that the particular transaction is a food expense. The hash tag serves various purposes, e.g., analytics, sorting. For example, if the user 115 has to determine the amount of bitcoins spent on food, the server 105 can search for transactions having the hash tag "#Food Expenses" and compute the number of bitcoins spent in those transactions. The server 105 can also enable the user 115 to sort the transactions based on the hash tags.

The transaction log 400 can also include an amount data field that indicates the number of virtual currency holdings (or a portion of a virtual currency holding) involved in the transaction. The transaction log 400 can also include a currency data field which includes a three letter code indicating the type of virtual currency, e.g., BTC for bitcoin. The transaction log 400 can also include a value data field which indicates a value of the virtual currency holding in fiat currency, e.g., U.S. dollars. The value in terms of the real currency is determined using a number of different methods. In one example, the value can be provided by a source, e.g., one of the wallet services 140, from which the transaction is extracted by the server 105. In another example, the user 115 can enter the value in the transaction log 400. In yet another example, the server 105 can determine the value of the bitcoin in the transactions using the date and time the transaction is performed on. For example, the server 105 can obtain the value of the bitcoins on a particular date from a specified server (not illustrated) associated with the virtual currency network 150 that stores the exchange value of the bitcoin (e.g., obtained from the preferred exchange in the market).

The transaction log 400 can also include a type data field which indicates a type of the transaction, e.g., purchase, income, sale, gift, transfer, and donation. In some embodiments, the structured data object may contain more information regarding a transaction that the server 105 displays in the transaction log 400. That is, the transaction log 400 may not display all the data fields of a transaction stored in the structured data object. For example, the structured data object can contain a transaction identification (ID) associated with the transaction extracted from a particular source but the transaction log 400 may not display the transaction ID. In some embodiments, the transaction ID is assigned to a transaction by the virtual currency network 150, which is unique to the transaction.

Figure 5:
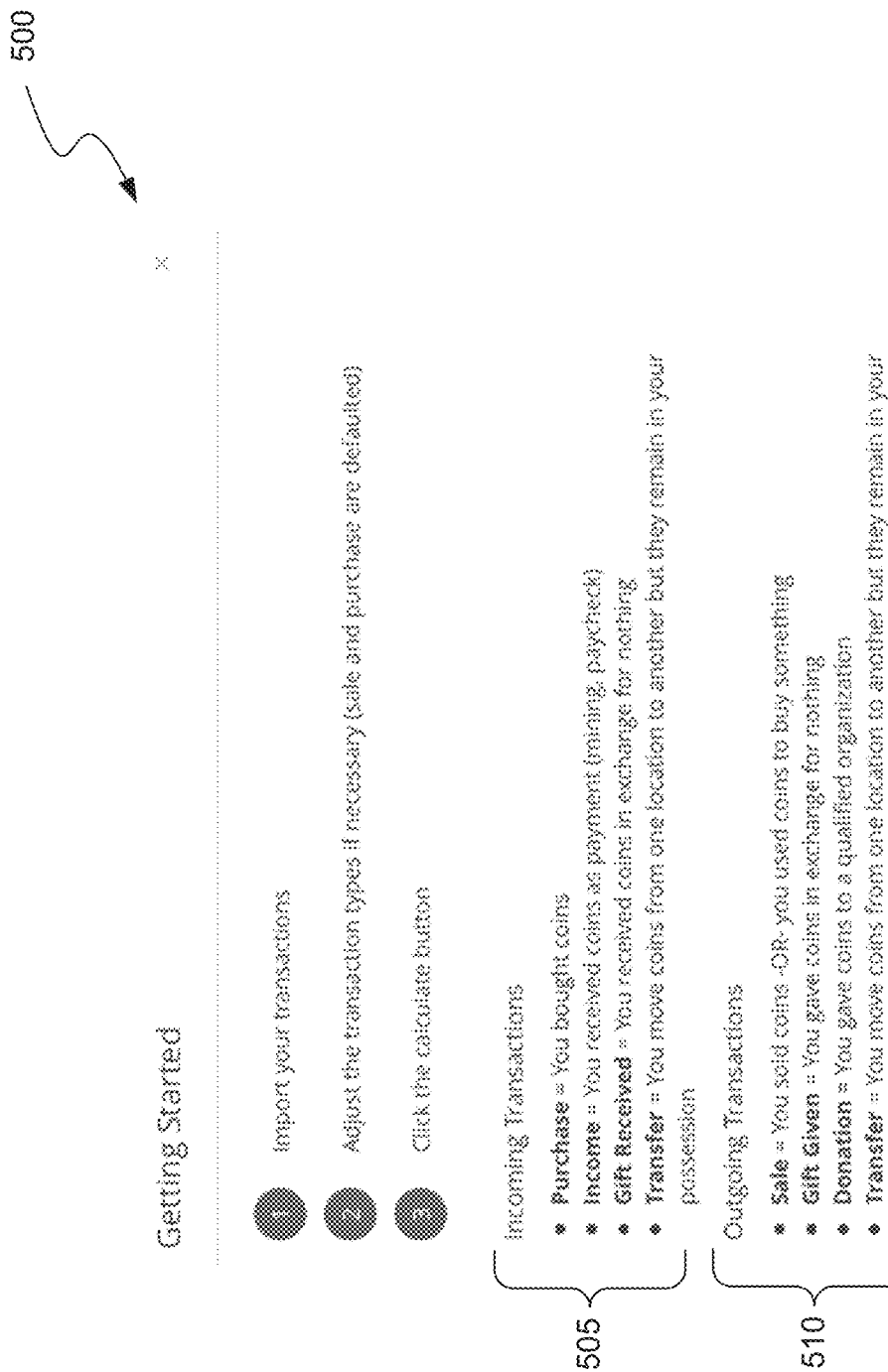
FIG. 5 is a block diagram illustrating an example of transaction types of a transaction, consistent with various embodiments.

FIG. 5 is a block diagram illustrating an example 500 of transaction types which transactions can be categorized into by the server of FIG. 1, consistent with various embodiments. In the example 500, the server 105 categorizes the incoming transactions into one of incoming transaction types 505 and the outgoing transactions into one of outgoing transaction types 510. In the incoming transaction types 505, the transaction type "purchase" can indicate buying of bitcoins. The transaction type "income" can indicate that the bitcoins are received as payment, e.g., as paycheck, mining. The transaction type "gift received" can indicate that the bitcoins are received as a gift. The transaction type "transfer" can indicate that the bitcoins are transferred from one wallet of the user 115 to another.

In the outgoing transaction types 510, the transaction type "sale" can indicate a sale of bitcoins or using of bitcoins for buying goods or services. The transaction type "gift given" can indicate that the bitcoins are gifted to another entity. The transaction type "donation" can indicate that the bitcoins are donated to a qualifying entity, e.g., charitable organizations or other organizations defined by local income tax laws the donations to whom can be exempted from taxable income.

In some embodiments, not all types of transactions are taxable. FIG. 6 is a block diagram illustrating an example 600 of classification of transaction types of FIG. 5 into taxable and non-taxable transactions, consistent with various embodiments. The server 105 can be configured to identify the transactions categorized as income, sale and donation as taxable transactions 610, and transactions categorized as purchase, gift received and sent and transfer as non-taxable transactions 605. In some embodiments, even though a particular transaction type is identified as non-taxable, the transaction type can have a bearing on computing the taxes. For example, a transaction that is categorized as purchase, though not taxable, can establish a cost basis for the bitcoins, e.g., at a specific rate or a fair market value. Further, in some embodiments, a transaction type can be categorized into taxable or non-taxable transaction type based on a total value of the bitcoins. For example, if the value of bitcoins in a gift given transaction is below a specified threshold, the transaction is considered as one of the non-taxable transactions 605, but if the value exceeds the specified threshold, the transaction is considered as one of the taxable transactions 610. In some embodiments, the server 105 is configured to categorize the transactions into non-taxable transactions 605 and taxable transactions 610 based on the local tax laws.

Referring back to the transaction log 400 in FIG. 4, the server 105 can automatically categorize the incoming transactions as purchases, and outgoing transactions as sales. Further, the server 105 can also automatically identify some of the transactions as transfers. For example, the server 105 can determine whether a wallet address and/or name of a particular incoming transaction matches with that of the outgoing transaction, and categorize both the incoming and outgoing transactions as a transfer. In another example, the server 105 can compare transaction IDs of both the incoming and outgoing transactions and categorize them as transfer if the transaction IDs are the same.

The server 105 can request the user 115 to further classify the transactions into one of the transaction types, e.g., described at least with reference to FIG. 5. The server 105 can then identify the taxable and non-taxable transactions, e.g., as described at least with reference to FIG. 6.

FIG. 7 is a block diagram illustrating examples of cost basis methods used by the server of FIG. 1 to compute the taxes on virtual currency holdings, consistent with various embodiments. The server 105 can compute the taxes based on various cost basis methods, e.g., FIFO method 705, LIFO method 710, AVCO method 715, OPT-H method 720 and OPT-L method 725. These cost basis methods have a bearing on the computed gains/losses, and therefore on the computed taxes. In some embodiments, in the FIFO method 705, the server 105 is configured to sell the bitcoins acquired first. In some embodiments, in the LIFO method 710, the bitcoins acquired last are sold first. In some embodiments, in the AVCO method 715, the server 105 is configured to average the cost basis from all the available bitcoins. In some embodiments, in the OPT-H method 720, the server 105 is configured to sell the bitcoins that are acquired at the highest price first. In some embodiments, in the OPT-L method 725, the server 105 is configured to sell the bitcoins that are acquired at the highest price after all long term gains are recognized.

Calculating the gains and losses based on the cost basis can be extremely complex as the right transactions, e.g., for acquiring and selling the bitcoins, have to be matched to realize the gain and/or loss based on the cost basis method. The server 105 may have to obtain the value of the bitcoins if they are not already provided, then analyze the transactions, e.g., using the date and the value fields, to find the right transactions to realize the gain and/or loss based on the cost basis method. For example, if the user 115 chose a OPT-H method 720, for a first outgoing taxable transaction in which a first number of bitcoins (or a portion of bitcoin) is sold, the server 105 may have to analyze the transactions to identify an income type transaction that has the highest exchange value for a unit of virtual currency holding among all the transactions, and then determine the gain and/or loss for the first number of bitcoins sold. This can be more complex if the first number of bitcoins sold is more than a second number of bitcoins in the identified income type transaction, or if the first number of bitcoins is only a portion of the second number of bitcoins as the server 105 may have to keep track of multiple transactions for realizing a gain and/or loss for a given transaction.

In some embodiments, the server 105 assigns a lot ID to every incoming transaction. When a bitcoin is sold, the server 105 assigns the transaction to one of those lot IDs based on the chosen cost basis method. For example, consider that there are "10" income type transactions. The server 105 can assign a lot ID from "1" to "10" to each of those transactions. When the taxes are computed, the server 105 can assign the sale transactions to one of the "10" lot IDs based on the cost basis method. For example, in the FIFO method 705, the server 105 can assign the first sale transaction to the first lot, e.g., lot ID="1." In some embodiments, this can help the user 115 in keeping tracking of how the transactions are matched for computing the taxes.

In some embodiments, the user 115 can also instruct the server 105 to selectively use the transactions for computing the gains and/or losses. For example, if the user 115 does not want to sell the first ever acquired bitcoin, the user 115 can configure the server 105 to exclude the transaction with a particular lot ID, e.g., lot ID corresponding to the first ever acquired bitcoin.

Figure 8:
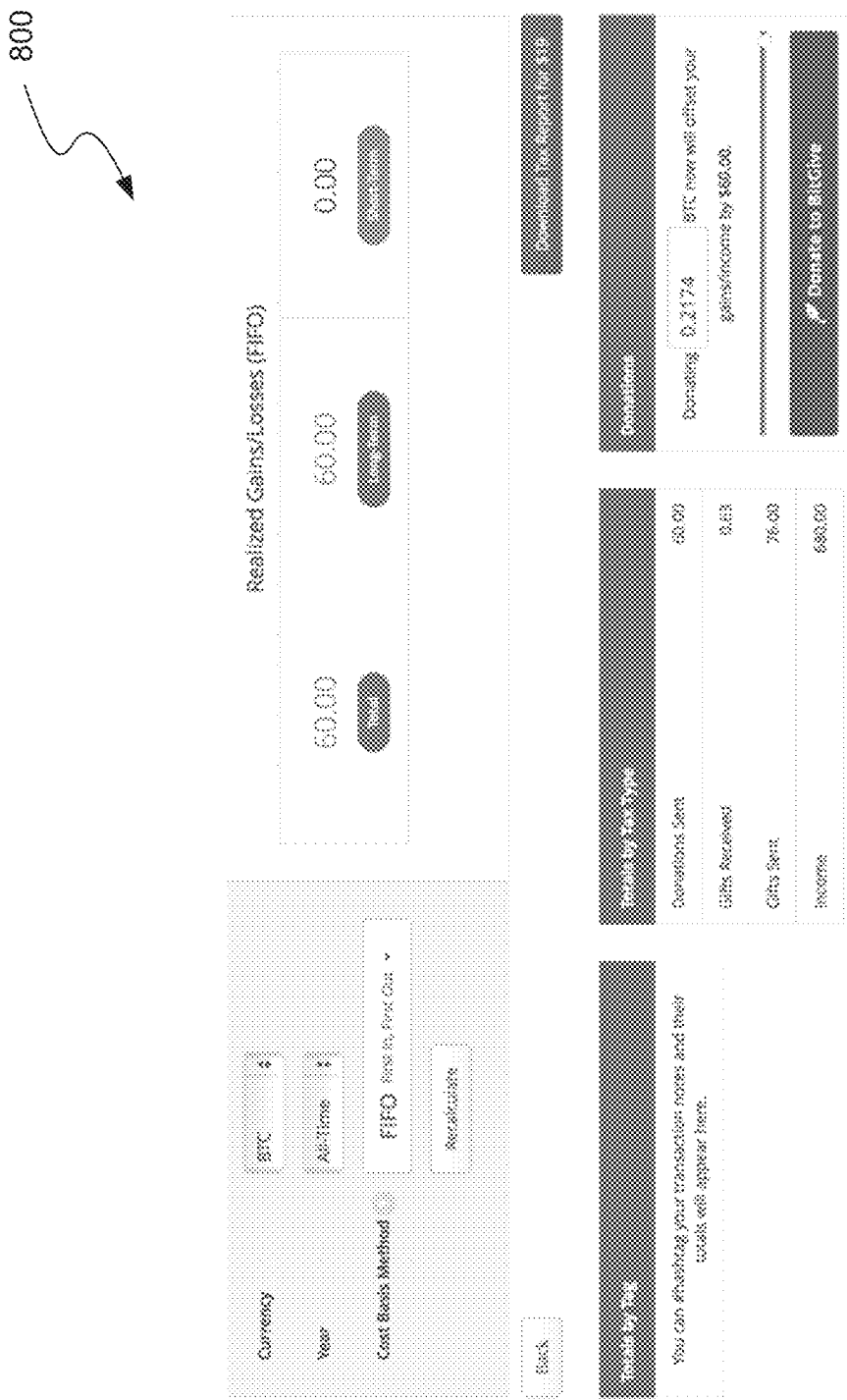
FIG. 8 is a block diagram of an example GUI for computing taxes for virtual currency holdings based on a cost basis method, consistent with various embodiments.

FIG. 8 is a block diagram of an example GUI 800 for computing taxes for virtual currency holdings based on a cost basis method, consistent with various embodiments. The GUI 800 includes a currency field in which the user 115 can specify the virtual currency, e.g., bitcoins, for which the taxes are to be computed. The GUI 800 includes a year field in which the user 115 can specify the period for which the taxes are to be computed. The GUI 800 includes a cost basis method field in which the user 115 can specify the cost basis method, e.g., described at least with reference to FIG. 7, using which the gains and/or losses for the virtual currency holdings are to be computed.

The server 105 computes the gains and/or losses, e.g., in fiat currency, based on the chosen cost basis method and present them in the GUI 800. The GUI 800 can display the short term gains/losses, the long term gains/losses and the total gains/losses. In some embodiment, the server 105 can also compute the estimated income tax for the computed total gains and/or loss and display the estimated income tax in the GUI 800. In some embodiments, the server 105 may not compute the estimated income tax as a total income tax for the user 115 can depend on other sources of the income, e.g., income earned through fiat currency. The user 115 may use the computed gains and/or losses in the process of calculating taxes for overall income of the user 115, e.g., income from virtual and fiat currency.

The server 105 can also display other information in the GUI 800. For example, the server 105 can be configured to display a sum total of some transactions, e.g., total of transactions having a particular hash tag. In another example, the server 105 can display the totals based on the transaction types, e.g., donations, gift sent, gift received, income.

In some embodiments, the server 105 can generate various reports, e.g., reports 130, that can be used by the user 115 to file taxes with the concerned departments. The reports 130 can be generated in a format that is acceptable by the concerned departments. FIGS. 9-13 illustrate examples of various reports generated by the server 105.

FIG. 9A is an illustration of an example tax report 900 including the gains and/or losses computed by the server of FIG. 1 for the virtual currency holdings, consistent with various embodiments. The tax report 900 can include details such as a date a virtual currency was bought and/or sold, the amount of virtual currency holdings bought and/or sold, the value of the virtual currency bought (cost) and/or sold (proceeds) and the gains and/or losses based on the cost and the proceeds. The tax report 900 can also include the type of gain and/or loss, e.g., long-term and short-term. In some embodiments, the tax report 900 is generated as a spreadsheet.

Figure 9B:
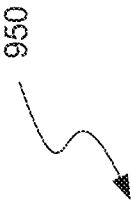
FIG. 9B is an illustration of an example of a prepared tax form including the gains and/or losses computed by the server of FIG. 1 for the virtual currency holdings, consistent with various embodiments.

FIG. 9B is an illustration of an example of a prepared tax form report 950 including the gains and/or losses computed by the server of FIG. 1 for the virtual currency holdings, consistent with various embodiments. The prepared tax form report 950 can include details such as a date a virtual currency was bought and/or sold, the value of the virtual currency bought (cost) and/or sold (proceeds) and the gains and/or losses based on the cost and the proceeds. In some embodiments, the prepared tax form report 950 is generated as a tax form that is in a format specified by a concerned department with which the taxes are filed.

FIG. 10 is an illustration of a balance report 1000 including purchase, sales and balance information of the virtual currency holdings, consistent with various embodiments. The server 105 generates a balance report 1000, which can include details of purchase and sales transactions of virtual currency holdings and a balance amount of the virtual currency holdings. For example, the balance report 1000 can include a date on which bitcoins are bought, an amount of the bitcoins bought and a value of the bitcoins bought; a date on which bitcoins are sold, an amount of bitcoins sold and a value of the bitcoins sold; and a balance amount of the bitcoins and a balance value of those bitcoins after the transactions.

FIG. 11 is an illustration of an outgoing report 1100 including information regarding outgoing transactions of the virtual currency holdings, consistent with various embodiments. The server 105 generates the outgoing report 1100 including details of outgoing transactions, such as a date on which the bitcoins are sold, an amount of bitcoins sold, a sale value per bitcoin, a value of the bitcoins sold; and a realized gain and/or loss.

FIG. 12 is an illustration of an incoming report 1200 including information regarding incoming transactions of the virtual currency holdings, consistent with various embodiments. The server 105 generates an incoming report 1200, which includes details of incoming transactions, such as a date on which the bitcoins are bought, an amount of bitcoins bought, cost per bitcoin in fiat currency, a total cost of the bitcoins bought in fiat currency, an amount of bitcoins sold, and a total sale value of the bitcoins. The incoming report 1200 can also include the lot IDs assigned to each of the incoming transactions.

FIG. 13 is an illustration of a master report 1300 including information regarding incoming and outgoing transactions and gains and/or loss, consistent with various embodiments. The server 105 generates a master report 1300 that can include data from a number of reports, e.g., reports 900-1200. In some embodiments, the master report 1300 includes details, such as a date on which the bitcoins are bought, an amount of bitcoins bought, an amount of bitcoins sold, cost per bitcoin in fiat currency, a total cost of the amount of bitcoins sold, a date on which the bitcoins are sold, a sale value per bitcoin on the sale data, a total sale value of the bitcoins, a realized gain and/or loss and a type of the realized gain and/or loss.

Figure 14:
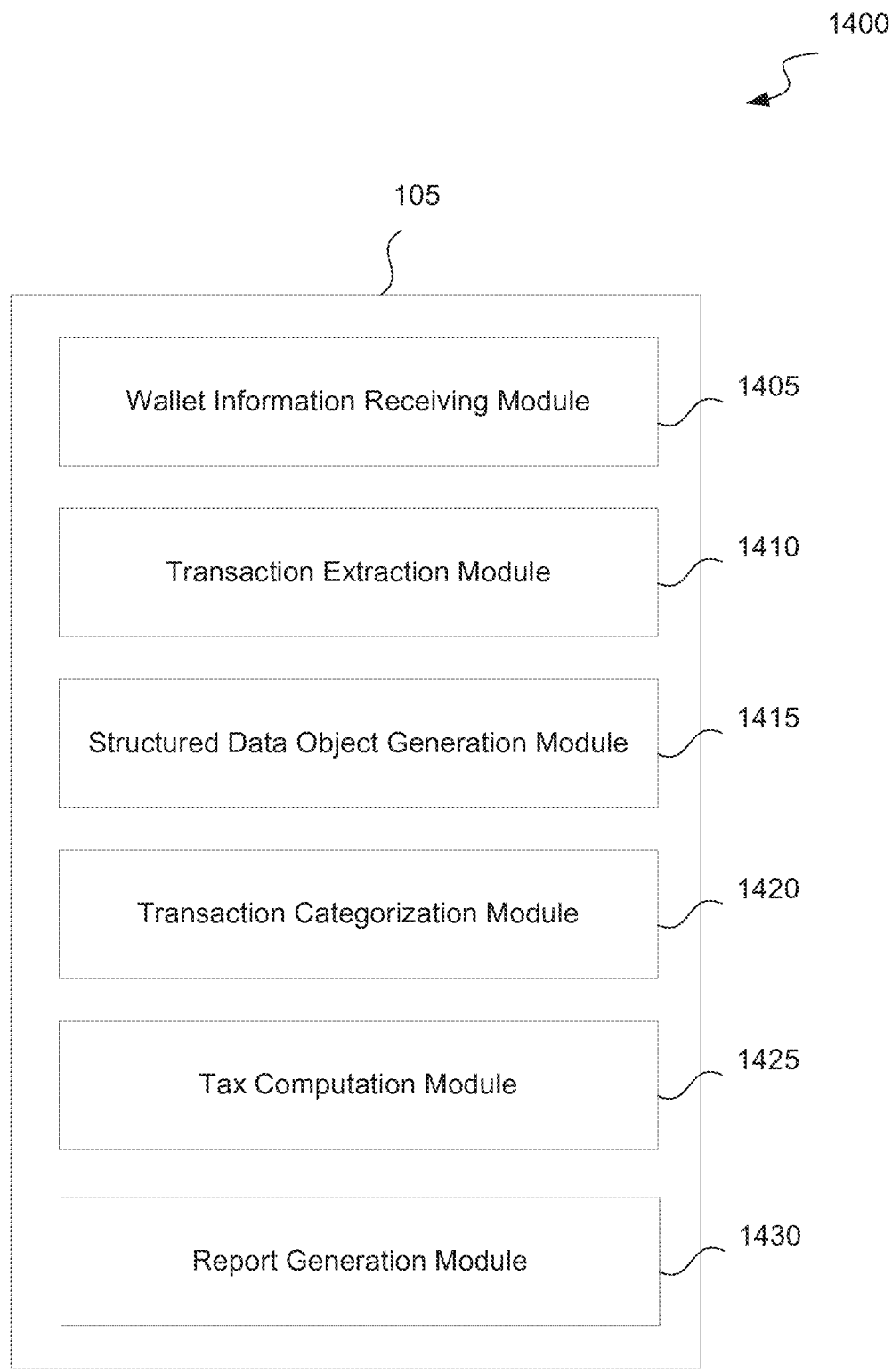
FIG. 14 is a block diagram of the server of FIG. 1, consistent with various embodiments.

FIG. 14 is a block diagram of the server of FIG. 1, consistent with various embodiments. In some embodiments, the server 105 implements the tax application using the modules 1405-1430. The server 105 includes a wallet information receiving module 1405 that is configured to receive wallet information, e.g., wallet address, authentication information of the user 115 for one or more wallet services 140, from the user 115. In some embodiments, the wallet information receiving module 1405 is configured to receive wallet information at least as described in association with FIG. 2.

The server 105 includes a transaction extraction module 1410 to extract the virtual currency transactions from the wallet services 140. The transaction extraction module 1410 can use the information obtained by the wallet information receiving module 1405 to access the wallet services 140 for extracting the transactions. The transaction extraction module 1410 can use the API provided by the wallet services 140 to extract the transactions from the wallet services. In some embodiments, the transaction extraction module 1410 extracts the transactions from the wallet services 140 as described at least with reference to FIGS. 1-4.

The server 105 includes a structured data object generation module 1415 to generate a structured data object containing the transactions in a specified format, e.g., as described above at least with reference to FIGS. 2-4. In some embodiments, different wallet services 140 can store the transactions in different format. The structured data object generation module 1415 can define a set of data fields of a transaction to be extracted from the wallet services 140. The structured data object generation module 1415 can instruct the transaction extraction module 1410 to extract the defined set of fields of the transaction from the wallet services 140 and store the transactions in the structured data object upon receipt.

The server 105 includes a transaction categorization module 1420 that can be configured to categorize the transaction into various transaction types, e.g., as described at least with reference to FIGS. 4 and 5. The transaction categorization module 1420 can further identify the transactions that are non-taxable and taxable from the extracted transactions, e.g., at least as described with respect to FIGS. 4 and 6.

The server 105 includes a tax computation module 1425 that can be configured to compute the gains and losses for the virtual currency holdings, e.g., as described at least with reference to FIGS. 7 and 8. The tax computation module 1425 can analyze both the taxable and non-taxable transactions and compute the gains and/or losses for the taxable transactions. The tax computation module 1425 can compute the gains and/or losses based on one or more cost basis methods. Further, in some embodiments, the tax computation module 1425 can also compute the estimated income tax based on the gains and/or losses.

The server 105 includes a report generation module 1430 that can be configured to generate various reports that can be used to file the taxes with the concerned authorities. In some embodiments, the report generation module 1430 generates the reports described at least with reference to FIGS. 9-13. Additional details with respect to the server 105 and/or the above modules 1405-1430 are described at least with reference to FIG. 15 below.

Note that the modules in the server 105 are not restricted to the ones illustrated in FIG. 14. The server 105 can include lesser number of modules, e.g., functionalities of two modules can be combined into one module, or can include more number of modules, e.g., modules that perform other functionalities. In some embodiments, the functionalities of one or more of the above modules can be split into two or more modules.

Figure 15:
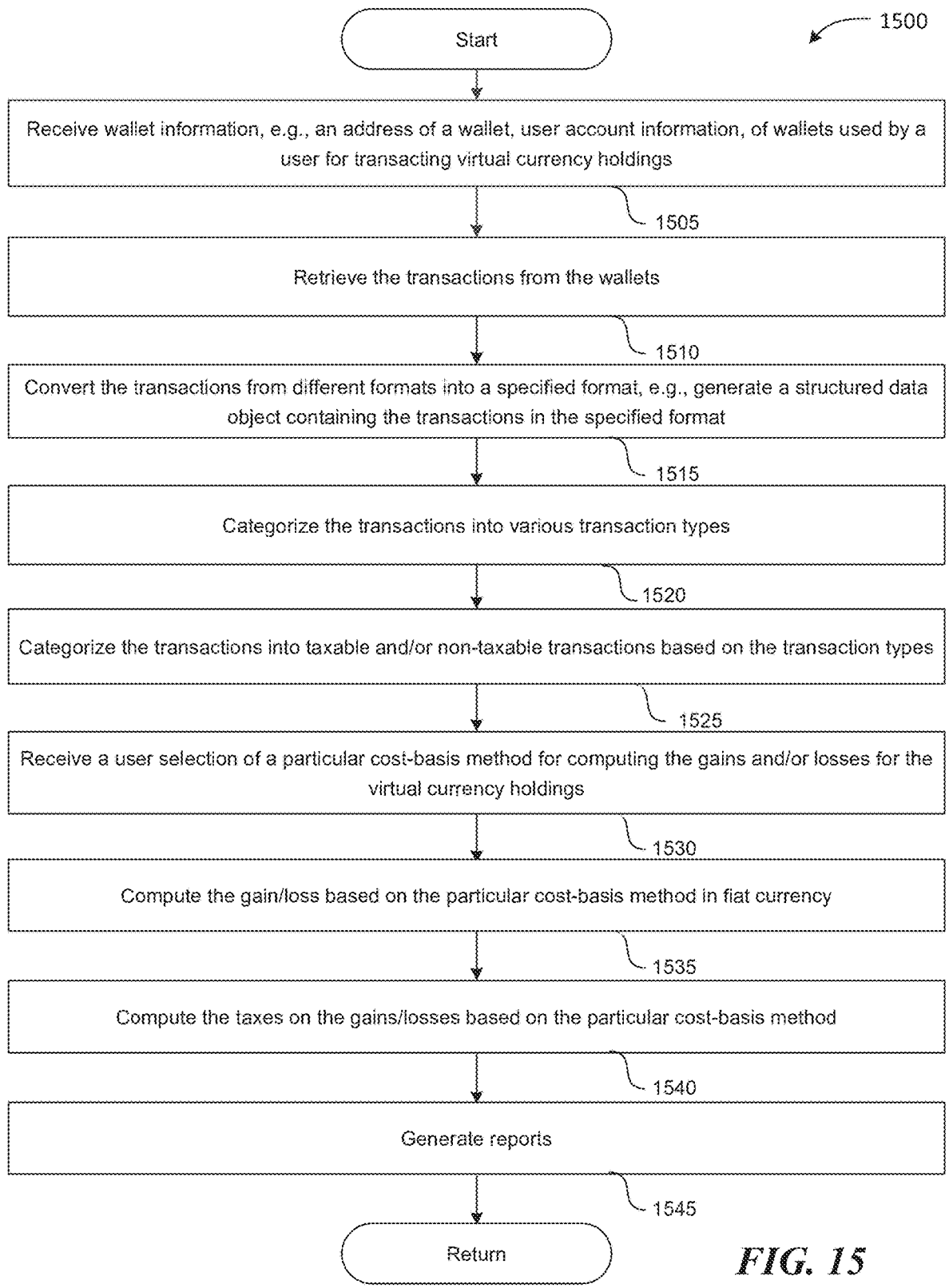
FIG. 15 is a flow diagram of a process for computing taxes on virtual currency holdings, consistent with various embodiments.

FIG. 15 is a flow diagram of a process for computing taxes on virtual currency holdings, consistent with various embodiments. In some embodiments, the process 1500 can be implemented in the environment 100 of FIG. 1. At step 1505, the wallet information receiving module 1405 receives information regarding various sources, e.g., wallets, where a user transacts and/or maintains virtual currency holdings. In some embodiments, the sources can be wallet services 140. The information regarding the sources can include a wallet address, user account information of a web wallet, a location of a transaction file on user's client, etc. In some embodiments, the wallet information receiving module 1405 receives the information regarding the sources as described at least with reference to FIGS. 2, 3A and 3B.

At step 1510, the transaction extraction module 1411 retrieves the transactions from the various sources, e.g., wallet services 140, using the provided source information. The transaction extraction module 1410 can retrieve the transactions from various sources as described at least with reference to FIGS. 2, 3A and 3B. For example, the transaction extraction module 1410 can retrieve the transaction from a web wallet, a desktop wallet or a data file. In some embodiments, the transactions are stored in different formats at different sources. In a first source, the transactions can be stored as a data object in a database. In a second source, the transactions can be stored as a data file, e.g., CSV. The transaction extraction module 1410 can use the API provided by the wallet services 140 to extract the transactions from the corresponding wallet services 140.

At step 1515, the structured data object generation module 1415 converts the transactions obtained from different wallet services 140 in different formats to a structured data object. The structured data object stores the transactions retrieved from the sources in a specified format. For example, the structured data object generation module 1415 defines a set of data fields of a virtual currency transaction that may be required by the server 105 for computing taxes of the virtual currency holdings, and the structured data object can store each of those data fields as an attribute of the structured data object. In some embodiments, some of the set of data fields are not available in the original transaction record that is extracted from a particular source, e.g., transaction types described in FIG. 5. The structured data object generation module 1415 can instruct the appropriate modules of the server 105 to determine the values for those data fields (which are described below). In some embodiments, the sources can have transaction details other than the set of data fields. In some embodiments, the structured data object generation module 1415 instructs the transaction extraction module 1410 to extract only the set of data fields defined by the structured data object generation module 1415. The transaction log 400 of FIG. 4 illustrates an example of data fields stored in the structured data object for a transaction.

At step 1520, the transaction categorization module 1420 categorizes the transactions into various transaction types, e.g., purchase, sales, income, gift given, gift received. In some embodiments, the transaction categorization module 1420 categorizes the transactions into various transaction types as described at least with reference to FIGS. 4 and 5.

At step 1525, the transaction categorization module 1420 further categorizes the transactions into taxable and/or non-taxable transactions. For example, the transaction categorization module 1420 can be configured with the local tax rules to identify a particular transaction as a taxable and/or non-taxable transaction. In another example, the transaction categorization module 1420 can be configured to use user-defined policies to identify a particular transaction as a taxable and/or non-taxable transaction. In yet another example, the transaction categorization module 1420 can request the user to manually categorize the transactions into taxable and/or non-taxable transactions. In some embodiments, the transaction categorization module 1420 categorizes the transactions into taxable and/or non-taxable transactions as described at least with reference to FIGS. 5 and 6.

At step 1530, the tax computation module 1425 can request the user to select a particular cost-basis method for computing the gains and/or losses for the virtual currency holdings (and therefore, taxes). The user can input the cost basis method as described at least with reference to FIG. 8. At step 1535, the tax computation module 1425 determines the gains and/or losses based on the selected cost basis method. In some embodiments, the tax computation module 1425 can determine the gains and/or losses based on all of the cost basis methods supported by the server 105. The user may then choose a particular cost basis method in which the gains are minimized and/or losses are maximized, and therefore the estimated taxes are minimized. In some embodiments, the tax computation module 1425 computes the gains and/or losses as described at least with reference to FIGS. 7 and 8.

At step 1540, the tax computation module 1425 computes an estimated tax for the determined gains and/or losses.

At step 1545, the report generation module 1430 generates various reports, e.g., reports of FIG. 9-13, that can be used by the user to file taxes with the concerned department, and the process 1500 returns. The user can download and/or print the reports 130 and use them for filing the taxes manually, e.g., via mail. Alternatively, the process 1500 may continue with the facilitating the user to file the taxes electronically. The user may use the prepared tax forms for other purposes as well, e.g., book keeping.

Figure 16:
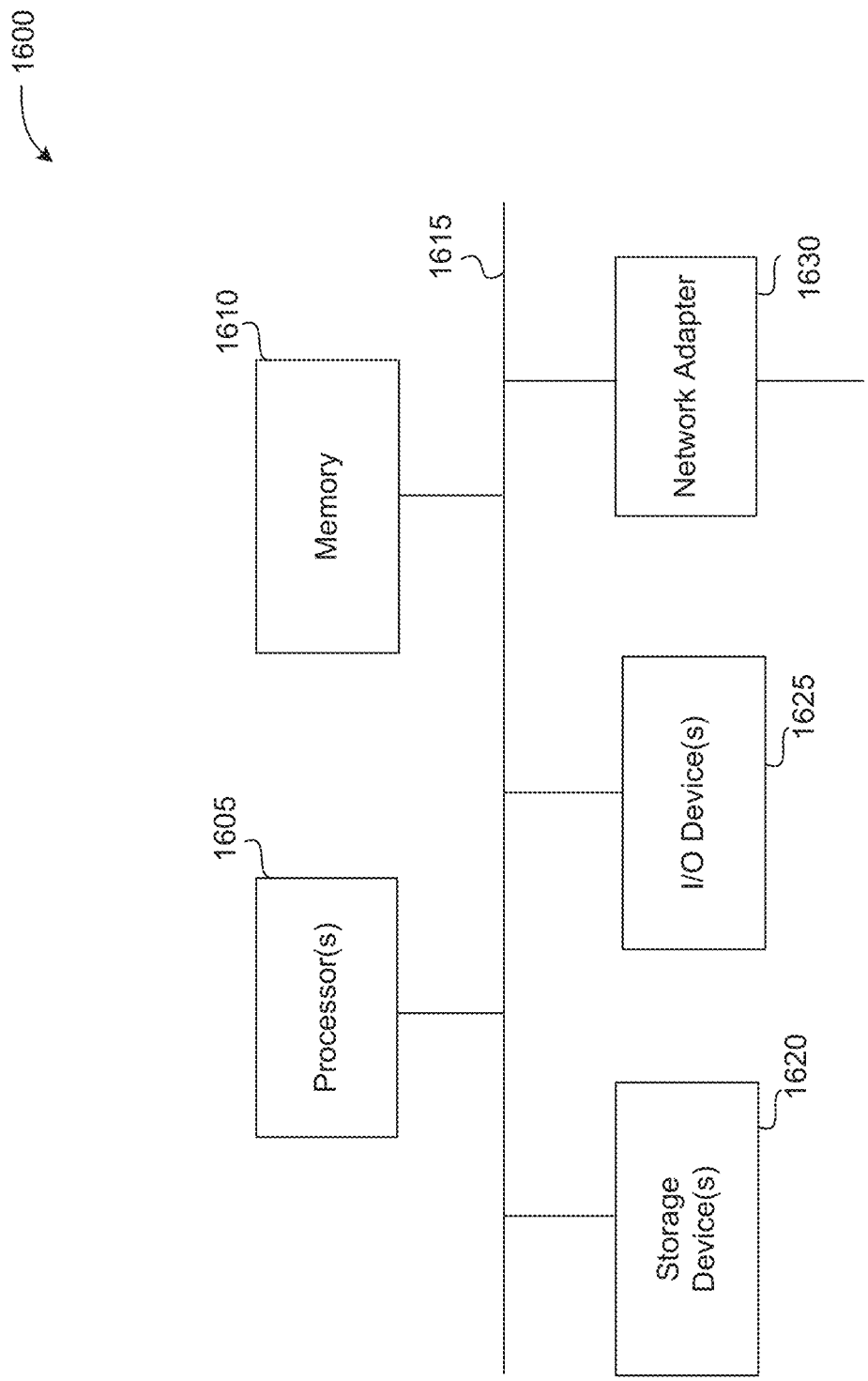
FIG. 16 is a block diagram of a computer system as may be used to implement features of some embodiments of the disclosed technology.

FIG. 16 is a block diagram of a computer system as may be used to implement features of some embodiments of the disclosed technology. The computing system 1600 may be used to implement any of the entities, components or services depicted in the examples of FIGS. 1-15 (and any other components described in this specification). The computing system 1600 may include one or more central processing units ("processors") 1605, memory 1610, input/output devices 1625 (e.g., keyboard and pointing devices, display devices), storage devices 1620 (e.g., disk drives), and network adapters 1630 (e.g., network interfaces) that are connected to an interconnect 1615. The interconnect 1615 is illustrated as an abstraction that represents any one or more separate physical buses, point to point connections, or both connected by appropriate bridges, adapters, or controllers. The interconnect 1615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1610 and storage devices 1620 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1610 can be implemented as software and/or firmware to program the processor(s) 1605 to carry out actions described above. In some embodiments, such software or firmware may be initially provided to the computing system 1600 by downloading it from a remote system through the computing system 1600 (e.g., via network adapter 1630).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method, comprising:

receiving, by a computing device, from a virtual currency network, a data set reflecting a plurality of virtual currency transactions performed by a plurality of digital wallets associated with a user;

converting, by identifying and extracting contents of one or more data fields of the data set, the data set into a plurality of virtual currency transaction records in a specified format;

identifying, among the plurality of virtual currency transaction records, a set of incoming transactions representing receipts of a virtual currency;

identifying, among the plurality of virtual currency transaction records, a set of outgoing transactions representing dispositions of the virtual currency;

identifying, among the set of incoming transactions and the set of outgoing transactions, a set of taxable transactions;

identifying, among the set of incoming transactions, an incoming transaction having a first transaction identifier matching a second transaction identifier of an outgoing transaction of the set of outgoing transactions;

excluding, from the set of taxable transactions, the identified incoming transaction and the identified outgoing transaction as representing a non-taxable transfer among the digital wallets of the user;

computing a taxable income of the user based on the identified set of taxable transactions;

computing an estimated income tax payable by the user on the taxable income; and electronically filing a statement of the estimated income tax.

2. The method of claim 1, wherein the taxable income and the estimated income tax are computed in a fiat currency.

3. The method of claim 1, wherein computing the taxable income is performed using one or more of a plurality of cost-basis methods.

4. The method of claim 1, wherein the incoming transaction represents one of: a purchase, a gift received, or a transfer from one of the plurality of digital wallets.

5. The method of claim 1, wherein the outgoing transaction represents one of: a sale, a gift given, a donation, or a transfer to one of the plurality of digital wallets.

6. The method of claim 1, wherein receiving information regarding the plurality of virtual currency transactions further comprises:

accessing, via an application programming interface (API), a digital wallet of the plurality of digital wallets.

7. The method of claim 1, further comprising:
assigning, to a virtual currency transaction of the plurality of virtual currency transactions, a hash tag indicative of a category of a transaction.

8. The method of claim 1 further comprising:
generating a report reflecting the plurality of virtual currency transactions.

9. The method of claim 1, further comprising:
generating a report reflecting a gain or loss realized on the virtual currency and a type of the gain or loss realized on the virtual currency, wherein the gain or loss is represented in a fiat currency.

10. The method of claim 1, further comprising:
receiving an identifier of a cost basis method for computing the estimated income tax.

11. The method of claim 1, further comprising:
generating a report reflecting the set of incoming transactions.

12. The method of claim 1, further comprising:
generating a report reflecting the set of outgoing transactions.

13. The method of claim 1, wherein excluding, from the set of taxable transactions, the identified incoming transaction and the identified outgoing transaction is performed responsive to determining that a first wallet address of the identified incoming transaction matches a second wallet address of the identified outgoing transaction.

14. The method of claim 1, wherein computing the taxable income further comprises:

receiving a fair market value of a unit of the virtual currency on a particular transaction date; and computing, based on the fair market value, a gain or loss realized on the virtual currency.

15. The method of claim 1, further comprising:
computing a gain or loss realized on the virtual currency; and presenting the computed gain or loss via a graphical user interface (GUI).

16. The method of claim 1, further comprising:
receiving, via a graphical user interface (GUI), authentication information associated with a digital wallet of the plurality of digital wallets; and utilizing the received authentication information for receiving the information from the virtual currency network.

17. A system, comprising:
a memory; and
a processor coupled to the memory, wherein the processor is configured to:

receive, from a virtual currency network, a data set reflecting a plurality of virtual currency transactions performed by a plurality of digital wallets associated with a user;

convert, by identifying and extracting contents of one or more data fields of the data set, the data set into a plurality of virtual currency transaction records in a specified format;

identify, among the plurality of virtual currency transactions, a set of taxable transactions;

identify, among the plurality of virtual currency transaction records, a set of incoming transactions representing receipts of a virtual currency;

identify, among the plurality of virtual currency transaction records, a set of outgoing transactions representing dispositions of the virtual currency;

identify, among the set of incoming transactions, an incoming transaction having a first transaction identifier matching a second transaction identifier of an outgoing transaction of the set of outgoing transactions;

exclude, from the set of taxable transactions, the identified incoming transaction and the identified outgoing transaction as representing a non-taxable transfer among virtual currency wallets of the user;

compute a taxable income of the user based on the identified set of taxable transactions;

compute an estimated income tax payable by the user on the taxable income; and electronically file a statement of the estimated income tax.

18. The system of claim 17, wherein excluding, from the set of taxable transactions, the identified incoming transaction and the identified outgoing transaction is performed responsive to determining that a first wallet address of the identified incoming transaction matches a second wallet address of the identified outgoing transaction.

19. A non-transitory computer-readable storage medium comprising executable instructions which, when executed by a processor, cause the processor to:

receive, from a virtual currency network, a data set reflecting a plurality of virtual currency transactions performed by a plurality of digital wallets associated with a user;

convert, by identifying and extracting contents of one or more data fields of the data set, the data set into a plurality of virtual currency transaction records in a specified format;

identify, among the plurality of virtual currency transaction records, a set of taxable transactions;

identify, among the plurality of virtual currency transaction records, a set of incoming transactions representing receipts of a virtual currency;

identify, among the plurality of virtual currency transactions, a set of outgoing transactions representing dispositions of the virtual currency;

identify, among the set of incoming transactions, an incoming transaction having a first transaction identifier matching a second transaction identifier of an outgoing transaction of the set of outgoing transactions;

exclude, from the set of taxable transactions, the identified incoming transaction and the identified outgoing transaction as representing a non-taxable transfer among virtual currency wallets of the user;

compute a taxable income of the user based on the identified set of taxable transactions;

compute an estimated income tax payable by the user on the taxable income; and electronically file a statement of the estimated income tax.

20. The non-transitory computer-readable storage medium of claim 19, further comprising executable instructions causing the processor to:

receive, via a graphical user interface (GUI), authentication information associated with a digital wallet of the plurality of digital wallets; and utilize the received authentication information for receiving the information from the virtual currency network.

\* \* \* \* \*